JOSEPH C. FROMMER
INVENTOR.

BY
Attorney

JOSEPH C. FROMMER
INVENTOR.

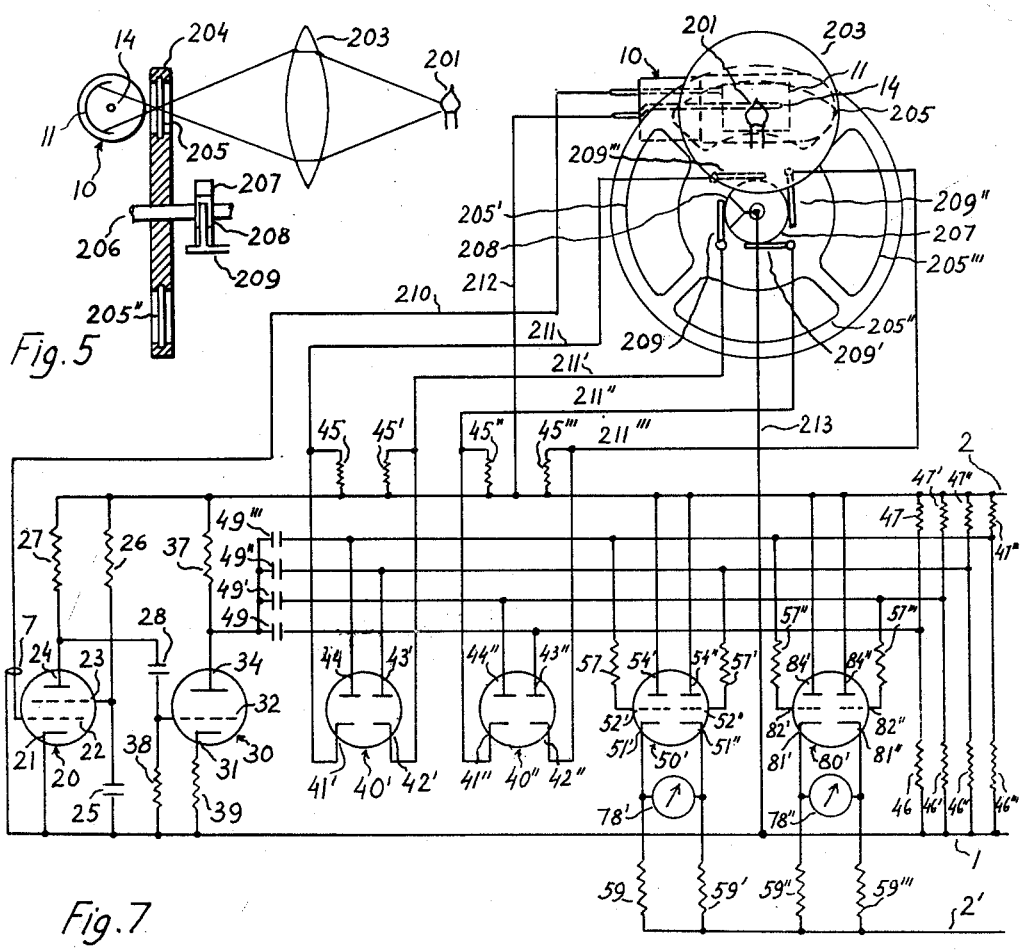

Aug. 8, 1950 J. C. FROMMER 2,517,554
METHOD OF AND DEVICE FOR DETECTING
PHYSICAL QUANTITIES
Filed June 21, 1949 7 Sheets-Sheet 4

JOSEPH C. FROMMER
INVENTOR.

BY
Attorney

JOSEPH C. FROMMER
INVENTOR.

Aug. 8, 1950

J. C. FROMMER 2,517,554

METHOD OF AND DEVICE FOR DETECTING
PHYSICAL QUANTITIES

Filed June 21, 1949

JOSEPH C. FROMMER

INVENTOR.

BY

Attorney

Aug. 8, 1950

J. C. FROMMER 2,517,554

METHOD OF AND DEVICE FOR DETECTING PHYSICAL QUANTITIES

Filed June 21, 1949

JOSEPH C. FROMMER
INVENTOR.

BY

Attorney

Patented Aug. 8, 1950

2,517,554

UNITED STATES PATENT OFFICE 2,517,554

METHOD OF AND DEVICE FOR DETECTING PHYSICAL QUANTITIES

Joseph C. Frommer, Cincinnati, Ohio

Application June 21, 1949, Serial No. 100,496

17 Claims. (Cl. 250—214)

This invention relates to a method of detecting physical quantities, i. e. the quantitative value of physical phenomena, which are capable of generating or influencing electric currents. The invention also relates to apparatus for carrying out such methods.

The novel method is basically one of comparison of two or more physical quantities which comparison involves causing a plurality of electric currents, including at least one current whose magnitude is a function of the physical quantity to be detected, to flow simultaneously between the electrodes of a circuit element under such conditions that the passage of current through said circuit element will cause a voltage between said electrodes which is a logarithmic function of the current so passing. At least one of said electric currents sent simultaneously through the circuit element mentioned has to be inconstant in such a manner as to vary its instantaneous value by an amplitude depending on the amplitude of the co-ordinated physical quantity. The voltage variations occurring between the electrodes of the circuit element in consequence of the variations of the instantaneous value of the mentioned inconstant current are utilized for an indication of the physical quantity to be detected and it is to be noted that a single such voltage variation may be sufficient for causing the desired indication.

The invention takes advantage of the fact that the difference of the logarithms of two quantities is the logarithm of their proportion, and that circuit elements are available, the voltage across which is a logarithm function of such current as passes between the electrodes of the circuit element within a certain current range. If the value of the current flowing across said circuit element changes, then the voltage variation is proportional to the logarithm of the proportion between the current before and the current after the change. If the proportion between the current before the change and the current after the change is indicative of the relationship between the two physical quantities to be compared, then the voltage variation occurring in connection with and at the rate of such current variations will equally be indicative of this relationship. These voltage variations I measure conveniently after suitable amplification, and use them for an indication of the relationship between the physical quantities to be compared.

The general principle just referred to is of very wide applicability as long as the physical quantities to be compared either directly or through some physical characteristics of them can influence electric currents. The physical quantity sought to be determined may be detected by comparison with another physical quantity of the same kind. For instance, the light intensity of a lamp in any direction may be compared with the light intensity of a standard lamp in a standard direction. Or, the physical quantity sought may be detected with reference to a physical quantity of another kind. For instance, the intensity of a certain light flux may be determined with the aid of a capacitor by measuring the relative modulation obtained by superimposing the direct current flowing across a certain phototube under the action of said light flux upon the alternating current flowing in said capacitor, if the latter is connected to a source of alternating voltage of a given frequency and given voltage. Comparison between two physical quantities of the same kind can be expressed by pure numbers. The comparison between physical quantities of different kinds will involve reference to some physical constants or to physical properties of some pieces of equipment.

The above mentioned logarithmic relationship required to exist between the voltage across the electrodes of the circuit element and the current flowing through that element may be expressed as:

$$I = I_0 e^{(V-V_0)/U}$$

where $I$ is the current flowing through the circuit element, $V$ is the voltage across the circuit element, $I_0$ is a constant (dimension current), and $V_0$ and $U$ are other constants (dimension voltage), all depending on the nature of the circuit element used. The above expression can be written:

$$V - V_0 = U \log(I/I_0) = U \log I - U \log I_0$$

Thus if the current in two different instances assumes the values $I_1$ and $I_2$, the voltage will assume the values:

$$V_1 = V_0 + U \log I_1 - U \log I_0$$

and $$V_2 = V_0 + U \log I_2 - U \log I_0$$

and the difference between the voltages in the two instances will be $$V_1 - V_2 = U \log I_1 - U \log I_2 = U \log(I_1/I_2)$$

This condition is illustrated in Fig. 16 of the drawings.

In this figure, the curve S represents the logarithmic characteristics between current I and voltage V by its rectangular coordinates. It is seen that if the current varies from $I_{11}$ to $I_{21}$ by the amount $I_{D1}$, the voltage across the electrodes varies from $V_{11}$ to $V_{21}$ by $V_{D1}$. And if the current varies from $I_{12}$ to $I_{22}$ by the same amount $I_{D2}=I_{D1}$, then the voltage varies from $V_{12}$ to $V_{22}$ by $V_{D2}$, which is substantially smaller than $V_{D1}$. This is because even though $I_{D2}=I_{D1}$, the proportion between $I_{D2}$ and $I_{12}$ is smaller than the proportion between $I_{D1}$ and $I_{11}$.

The difference $I_{D1}$ or $I_{D2}$ may symbolize one single step of current increase or current decrease, or the amplitude of modulation of a periodically varying current.

One of the currents flowing in the circuit element may be $I_{11}$ and another $I_{D1}$. By suddenly interrupting $I_{D1}$ (or by suddenly turning it on) we obtain a voltage step $V_{D1}$ which is significant of the ratio $I_{11}:I_{21}$. The ratio of the two currents to be compared can be calculated by putting:

$$\frac{I_{D1}}{I_{11}}=\frac{I_{21}-I_{11}}{I_{11}}=\frac{I_{21}}{I_{11}}-1=\frac{1}{I_{11}:I_{21}}-1$$

In other instances, one of the currents flowing in the circuit element may be a direct current of the magnitude $(I_{11}+I_{21})/2$, and the other an alternating current of the peak to peak amplitude $I_{D1}$. Then the proportion between $I_{D1}$ and $(I_{11}+I_{21})/2$ can be calculated from $I_{11}:I_{21}$ by putting:

$$\frac{I_{D1}}{(I_{11}+I_{21})/2}=\frac{I_{21}-I_{11}}{(I_{11}+I_{21})/2}=\frac{1-I_{11}/I_{21}}{(I_{11}/I_{21}+1)/2}$$

In still other instances, one of the currents may be a direct current of the magnitude $I_{21}$ and the other a current varying periodically between the values $I_{12}-I_{21}$ and $I_{22}-I_{21}$. Then, if we know the relative modulation of the second current, similar algebraic operations will yield the proportion between $I_{21}$ and $(I_{22}-I_{21})$ from the proportion $I_{12}:I_{22}$ which can be determined, according to the invention, from $V_{D2}$.

The curve S' of the drawing has been obtained by parallel shifting the curve S in direction of the V axis. It will be seen (and can be proved mathematically) that the voltage variations $V_{D1}'$ and $V_{D2}'$ obtained with these shifted characteristics are equal to $V_{D1}$ and $V_{D2}$ obtained with the original characteristics for the same current variations.

The voltage resulting from the simultaneous application of the several currents upon one and the same circuit element having logarithmic characteristics may be used to actuate a signalling or controlling device. In some cases, however, it may be desirable that the comparison yield numerical data which are identical to, proportional to, or known functions of the proportions between two physical quantities, or the magnitude of one of two physical quantities, while the other physical quantity is maintained constant and serves as a standard of reference. In other applications, it may be desirable to enable an operator to change some controls until comparison indicates equality or a certain relationship, so that from the setting of the controls conclusions can be drawn on one or the other physical quantity. Or, a device can be constructed which acts on certain circuit elements till equality or a certain ratio between two physical quantities is achieved. The numerical data obtained may be indicated by an indicating instrument or recorded by a recording instrument.

If one of the physical quantities is of inconstant character, such as, e. g. the light emitted by a lamp fed by pulsating current, then the required variations of current are present without further steps. If, however, all the physical quantities to be compared are of constant character, then I cause at least one of them to vary its magnitude, periodically interrupt the action of one of them on the circuit element sensitive to it, or periodically interrupt the current of this circuit element. For example, the photoelectric current created by a phototube under the influence of light emitted from a lamp fed by direct current (or by alternating current of such frequency that the fluctuations in light intensity are of no consequence) can be made inconstant in one of many different ways which will be obvious to those skilled in the art, such as by interposing a light chopper between the lamp and the phototube, or by periodically interrupting said photo-electric current, etc. It is also possible to cause just one variation of the physical quantity used as a reference, such as by turning on or off some physical action and detecting the variation in voltage occurring on the logarithmic circuit element due to this variation. A readily accessible circuit element across which the voltage is a logarithmic function of the current in it is the path of an amplifier tube between the thermionic cathode thereof and the first of the other electrodes which surround the cathode. Ordinarily the first other electrode is the control grid of the tube. In usual vacuum tubes the current between the cathode and said first grid is temperature limited if this first grid is left to assume a voltage somewhere between minus 2 and 0 volts with respect to the cathode. The voltage then is very exactly a linear function of the logarithm of the current between the two electrodes mentioned. If the insulation is kept high, and the voltages on all other electrodes are kept low, say below 20 volts in ordinary radio tubes, or below 5 volts in special tubes built for operation at so low voltages and if other measures to keep grid leakage low, known to those skilled in the art, are followed, then the linear relationship between grid voltage and the logarithm of the cathode-grid current will be maintained even for extremely low values of said current between cathode and grid. This invention then also provides a novel method to measure extremely low direct currents by comparing them with alternating currents of known magnitude as will be shown in detail later.

The grid to cathode path of an amplifier tube is not the only circuit element across which the voltage is a logarithmic function of the current across it. For example, a diode operating in the temperature limited region, i. e. at a voltage range of say minus 2 to 0 volts between anode and cathode may serve the same purpose. Or certain portions of the current/voltage characteristics of nonlinear resistors, as e. g. "thyrite" may also be used for the purpose of the invention.

It is well known that whereas the temperature controlled current adheres very rigorously to the exponential law, the contact potential between the surface of the grid and the rest of the circuit may shift these characteristics by several tenths of a volt. This shift asks for recalibration in usual circuits, but does not affect exact functioning of the circuits to be described, as is seen by comparison of voltage variations obtained along curve S' with those obtained along curve S in Fig. 16.

A change in temperature of the cathode will change the exponent in the logarithmic function. The temperature of the cathode can be kept constant by voltage regulating transformers, current regulating tubes, or other means. But I have found that the changes occurring due to normal variations in line voltage are of little significance and may be compensated in the amplifier by means that influence the indication of the system in opposite direction.

It is also known that circuit elements that indicate various physical quantities by proportional currents, e. g., phototubes, may change their sensitivity with time, variations of temperature, etc. If the physical quantities to be compared are of the same kind, I preferably cause them to act on the same such circuit element, and then such variation of sensitivity will not affect the proportion of currents caused by each of them and will in no way impair exact indication of their proportion by the circuits according to the invention.

The invention will now be explained with reference to the accompanying drawings, in which:

Fig. 5 represents diagrammatically a device for measuring the spectral composition of a source of light;

Fig. 6 shows the device of Fig. 5 in an end view, together with the diagram of a circuit to be used with this device;

Figs. 7 and 8 represent time curves of voltages obtained in the device of Figs. 5 and 6;

Figure 1:
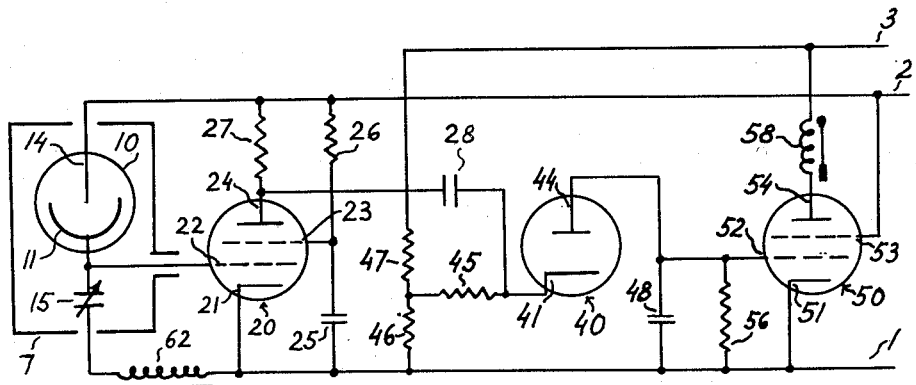
Fig. 1 represents the circuit diagram of a simple but sensitive photoelectric relay circuit.

The device diagrammatically shown in Fig. 1 may serve the purpose of actuating a relay 58, if the illumination of a phototube 10 surpasses a certain limit. In this figure, 10 denotes a phototube surrounded by an electrostatic shield 7 and having a cathode 11 and an anode 14. 20 denotes an amplifier tube having a cathode 21, a grid 22, a screen grid 23, and an anode 24. The cathode 21 of tube 20 is heated by a filament which, as conventional in the illustration of indirectly heated cathodes, is not shown, as are not shown the other filaments in the drawing. The tube 20 may also conveniently have a third or suppressor grid between the screen grid 23 and plate 24, this suppressor grid being connected to the cathode 21 internally or externally of the tube. Such optional suppressor grid is not shown in the drawing neither for tube 20 nor for any other amplifier tube to be mentioned hereafter. 40 denotes a rectifier tube having a cathode 41 and a plate 44. 50 is an amplifier tube having a cathode 51, a grid 52, a screen grid 53 and a plate 54. 1, 2 and 3 are terminals of a supply of direct voltage, 1 being the common negative terminal, 2 a terminal supplying a voltage of, say, 150 volts D. C. stabilized by a voltage regulating tube, not shown, and 3 a terminal supplying say 300 volts D. C. which need not be stabilized. 62 denotes a secondary winding of a transformer 60 only partly shown. The winding 62 may be the filament winding of the power supply transformer of the amplifier or one half of it. It is connected between line 1 and one terminal of a variable capacitor 15. The other terminal of the capacitor 15 is connected to the grid 22 of tube 20 which is also connected to the cathode 11 of the phototube 10. The anode 14 of the phototube 10 is connected to line 2. The cathode 21 of tube 20 is connected to line 1, its screen grid 23 is connected across a capacitor 25 to line 1 and across a resistor 26 to line 2. Its anode 24 is connected across a resistor 27 to line 2 and across a capacitor 28 to the cathode 41 of the rectifier 40. The rectifier cathode 41 is connected across a resistor 45 to the midpoint of a voltage divider 46, 47 connected between the lines 3 and 1. The plate 44 of the rectifier 40 is connected to the grid 52 of vacuum tube 50, and across a capacitor 48 which is in parallel with a resistor 56, to line 1. The cathode 51 of the amplifier tube 50 is connected to line 1, its screen grid 53 to line 2 and its plate 54 across the coil of a relay 58 to line 3. The only connection to cathode 11 of the phototube 10 being the capacitor 15 which can carry no direct current and the grid 22 of tube 20, all photoelectric current flowing from cathode 11 to anode 14 of the phototube 10 must flow also from cathode 21 to grid 22 of tube 20. Due to the logarithmic relationship between grid current and grid voltage the conductance between grid and cathode is proportional to the grid current. Now grid 22 lies on the midpoint of a voltage divider formed by the capacitor 15 and the grid to cathode path of tube 20. This voltage divider is fed by the transformer winding 62 of the transformer 60. The A. C. voltage appearing between grid 22 and cathode 21 will be the greater the lower the grid to cathode admittance. But the grid to cathode admittance is the greater the greater the photoelectric current is, and therefore the A. C. voltage appearing between grid 22 and cathode 21 is indicative of the photoelectric current. The alternating voltage appearing across the load resistor 27 depends on this A. C. voltage across 22, 21. It might also depend on the average (or D. C.) voltage across 22, 21, but this effect can be kept negligible by using a sufficiently high screen resistor 26. The A. C. voltage obtained on plate 24 is transmitted across a capacitor 28 to the cathode 41 of the diode 40. This A. C. will develop on plate 44 a negative D. C. voltage with respect to cathode 41. If this voltage becomes higher than the positive voltage existing on the midpoint of the voltage divider 46, 47 the grid 52 of tube 50 will become negative enough to cut off the plate current of tube 50 and cause relay 58 to drop out. If, later the illumination of the phototube 10 increases above a certain limit, the A. C. impedance on grid 22 will decrease, causing the A. C. voltage appearing there to decrease. The reduced grid A. C. will cause lower A. C. on plate 24 and lower D. C. developed in 40, and consequently it will allow sufficient plate current in tube 50 to pull in relay 58.

The phototube 10, the grid 22 and the connection between them and the capacitor 15 has to be carefully shielded to avoid interference of spurious A. C. signals with the well defined A. C. injected to grid 22 by capacitor 15. The photoelectric current at which the relay will act can be varied by varying the capacitance of capacitor 15. The lower this capacitance is set, the lower will be the photoelectric current at which the relay acts. A limitation to the sensitivity of this circuit is set by the grid to cathode capacitance. Its susceptance is always parallel to the grid to cathode conductance caused by the photoelectric current flowing between grid and cathode. Therefore, the grid to cathode admittance will vary only slightly with variations in photoelectric current if the conductances due to these photoelectric currents are below the susceptance of the grid capacitance.

Figure 2:
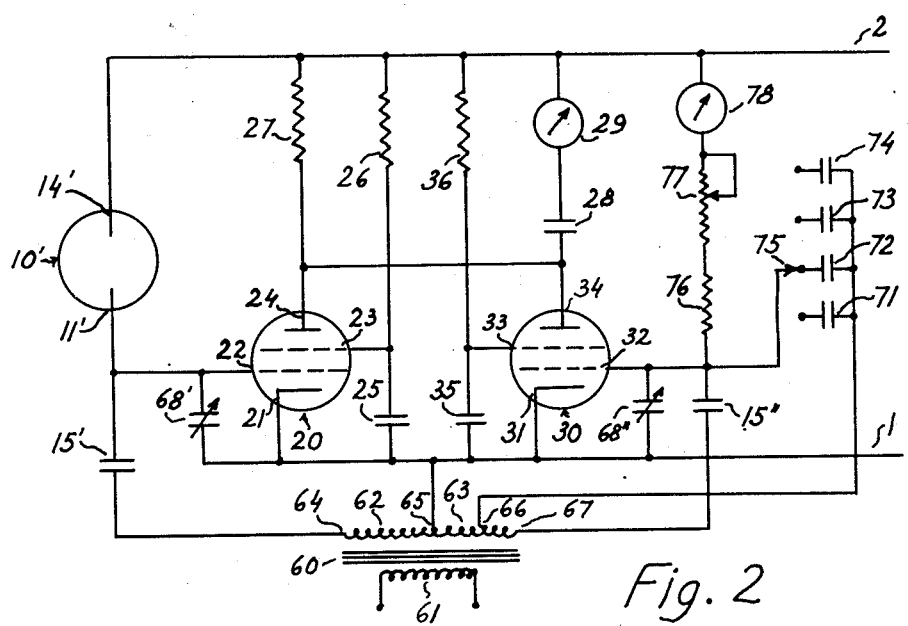
Fig. 2 shows a circuit suitable for measuring extremely small currents by a balance method.

The sensitivity of circuits according to the invention may be increased beyond the above limit by a circuit as shown in Fig. 2. This circuit may measure accurately the extremely small current flowing in an ionization gauge 10' having an anode 14' and a cathode 11'. Those parts of the circuit which are similar to parts of the circuit shown in Fig. 1, are denoted by the reference numerals as are used in Fig. 1. 20 is an amplifier tube having a cathode 21, a grid 22, a screen grid 23 and an anode 24. 30 denotes another amplifier tube having a cathode 31, a grid 32, a screen grid 33 and a plate 34. 29 denotes some means to measure alternating voltage, such as a cathode ray indicator or a vacuum tube voltmeter. 28 is a capacitor to withhold D. C. from the instrument 29. 78 is an instrument to measure D. C., conveniently of the Deprez type. 75 is a selector switch. 60 is a transformer, and 1 and 2 are, respectively, the negative and positive terminals of a source providing regulated D. C. voltage.

The primary 61 of the transformer 60 is connected to an A. C. source not shown and of very low frequency, say 5 cycles per second. Two equal secondary windings 62, 63 of the transformer 60 have a common terminal 65 connected to line 1, whereas their opposite terminals 64, 67 are connected across capacitors 15', 15", respectively, to the grids 22 and 32 of the tubes 20 and 30; a tap, 66 of the winding 63 is connected to one terminal of each of the capacitors 71, 72, 73, 74. Switch 75 can make contact between the grid 32 of tube 30 and the other terminal of one of said capacitors 71 through 74. Grid 22 of tube 20 is further connected across a variable capacitor 68' to line 1 and across the ionization gauge 10' to line 2. Grid 32 is further connected across a variable capacitor 68" to line 1, and across series connection of a fixed resistor 76, a variable resistor 77 and a galvanometer 78 to line 2. The screen grids 23 and 33 of the tubes 20, 30 are connected across capacitors 25 and 35, respectively, to line 1, and across resistors 26 and 36, respectively, to line 2. The anodes 24 and 34 of the tubes 20 and 30 are connected together and across resistor 27 to line 2. The indicator of alternating voltage 29 in series with the capacitor 28 is connected between the anodes 24, 34 and line 2.

The capacitors 68', 68" are to be set once so as to bring the grid capacitance plus stray capacitance of the grids 22, 32 to a predetermined value, which thereinafter will be called "preset grid capacitance" and which may be, e. g. 5 mmfd. The capacitors 15' and 15" are equal to each other and chosen so as to be a simple multiple or submultiple of said "preset grid capacitance" or preferably equal to it. The tap 66 is taken at a point at which the voltage equals the voltage that would appear on grid 32 if switch 75 and resistor 76 were both disconnected. The capacitors 71, 72, 73, 74 are chosen so as to have respectively a capacitance of say 99, 999, 9999, and 99,999 times the sum of the capacitance of 15' and of the preset grid capacitance. Each of these ratios increased by 1 will be called "multiplier."

Measurement of the current flowing in the ionization gauge is done by altering the value of the resistor 77 until the indicator of alternating voltage 29 shows zero. If this is reached, then the reading of the galvanometer 78 divided by the multiplier chosen by means of the selector 75, will give the current flowing in the ionization gauge 10'. This result is based on the known facts that (1) a voltage divider is equivalent to a voltage source having the voltage appearing on the unloaded midpoint of the voltage divider and having an inner resistance equal to that which would be obtained by parallel connection of the two arms of the voltage divider, and (2) the current flowing from a thermionic cathode to the grid of a vacuum tube is an exponential function of the voltage between said two electrodes. From (1) it follows that grid 22 is influenced by an alternating voltage equal in magnitude but opposite in phase to that existing on tap 66, acting across a capacitance equal to the sum of capacitance 15' and of the preset grid capacitance, whereas grid 32 is influenced by an equal voltage across a capacitance which is as many times as great as the former capacitance as the chosen multiplier indicates. To reach a balance between the plate signals of the tubes 20 and 30, it is necessary that the direct current injected across 10' to grid 22, and the direct current injected across 76, 77, 78 to grid 32, be in the same proportion as these capacitances. For only in this case will the additional conductances due to D. C. grid current of the grid to cathode paths be proportional to the susceptances of the respective capacitive voltage dividers.

The above discussion assumed exact equality between the two tubes 20 and 30, and also that the resistors 26, 36 are high enough to keep the mutual conductance of both tubes equal despite the slight differences between their average grid voltages. Slight discrepancies from theoretical conditions can be taken into calibration or corrected by equalizing means as well known in the art. If the theoretical conditions are not exactly adhered to, no exact balance can be obtained, and the meter 28 will indicate zero in no position of the resistor 77. Under such conditions, balance can best be found by utilizing an indicator that indicates the magnitude of only that component of the A. C. voltage difference between grids 22 and 32 which is 90° out of phase with the voltage across 64, 67. Such an indicator indicates whether the resistor 77 is at one or at the other side of its position for best balance. A cathode ray tube null indicator, e. g. one as described in my co-pending patent application Ser. No. 24,185 of April 30, 1948, may also be employed.

The frequency of the alternating voltage applied to transformer 60 should be chosen low, because the lower this frequency is, the higher will be the reactance of a given capacitance to this alternating voltage. The following numerical example illustrates the orders of magnitude involved: With ordinary vacuum tubes the input capacitance may be held at say 5 mmfd. The reactance of 5 mmfd. at 5 C. P. S. is about 6000 megohms. The A. C. resistance of the grid to cathode path when a grid current of $10^{-12}$ amps. flows is in the order of 100,000 megohms.

Figure 3:
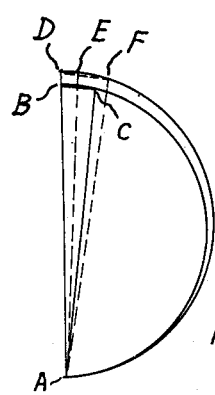
Fig. 3 is a vector diagram.

The need for discrimination between in phase and out of phase components of the voltage appearing on the anodes 24, 34 can be best explained in connection with the vector diagram of Fig. 3. In this figure, the vector AB represents the alternating voltage that would appear between grid 22 and cathode 21 of the tube 20, if the grid current was zero. The vector AC represents the voltage between grid 22 and cathode 21 if, due to a certain grid current, the grid admittance is increased. The vector DA represents the alternating voltage between grid 32 and cathode 31 for zero grid current in tube 30, whereas the vectors EA, FA represent the alternating voltage between grid 32 and cathode 31 obtained with two different values of grid current. The point C lies on the arc drawn around diameter AB; points E, F, and all other points corresponding to other values of grid current in the tube 30 lie on an arc around diameter AD. Now, if the tap 66 is properly chosen, then the diameter AB coincides with the diameter AD, and the arcs drawn around these two diameters will coincide with each other. Therefore, whatever the position of point C may be, there can be found on arc AFED a point coinciding with C. The direct current corresponding to this point will cause perfect balance between the anode signals of tubes 20 and 30. But if the tap 66 is slightly different from what it should be theoretically, or if the stray capacitance from 22 varies after 68' had been properly adjusted, point D moves away from point B and there can be found no point on arc AFED coinciding with point C. Then it is no more possible to obtain zero alternating voltage on anodes 24, 34. The minimum of alternating voltage will be reached when the grid current in 30 brings the vector point on arc AFED closest to point C. The plate signal will have a rather flat minimum, but its component perpendicular to the vector AB will go through zero almost exactly when this minimum is reached and this sharp zero reading may then be used to determine the position of point C, and from it, the current flowing between grid and cathode of the tube 20, which in turn is the current of the ionization chamber 10', desired to be measured.

When the multiplier is as high as in the examples given, the effect of the condenser 68'' on grid 32 is negligible and 68'' may be omitted.

Figure 4:
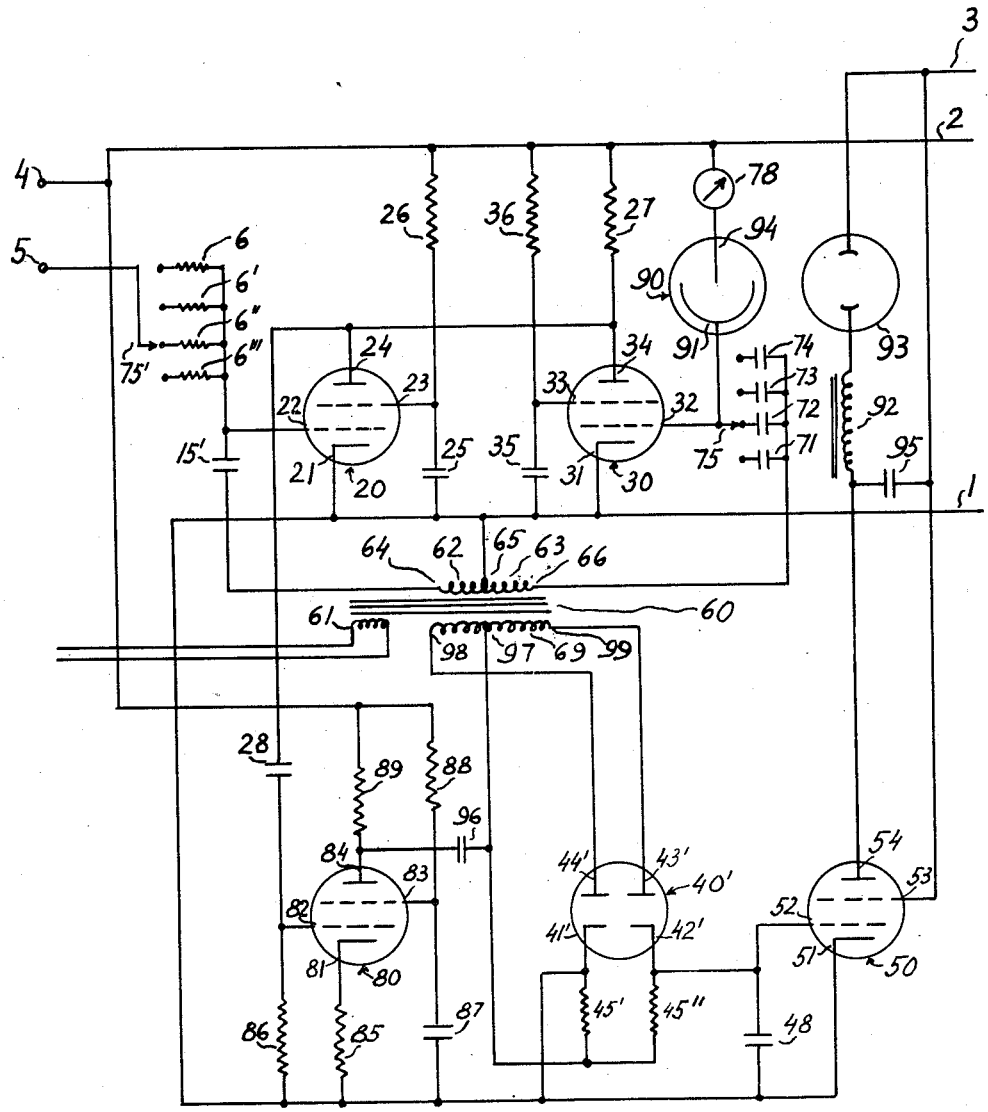
Fig. 4 shows a modified circuit for measuring extremely small currents.

In this circuit, balance had to be obtained manually. Automatic balance between the known current and the unknown can be obtained also by automatic means as is shown in Fig. 4 which represents a circuit suitable, for instance, for the measurement of very low leakage currents flowing across parts to be tested for insulation. It comprises amplifier tubes 20, 30, 80 and 50 each having respectively, a cathode 21, 31, 81, 51, a grid 22, 32, 82, 52, a screen grid 23, 33, 83, 53, and a plate 24, 34, 84, 54. There are further provided a twin diode 40', having cathodes 41' and 42' and anodes 44' and 43', a phototube 90, having a cathode 91 and an anode 94, a lamp 93, preferably of the glow discharge type, a D. C. microammeter 78, a transformer 60, and a twin selector switch consisting of switch units 75 and 75'. B supply is furnished by a conventional power supply not shown in the drawing, with its negative terminal connected to line 1, its positive terminal of say 300 volts connected to line 3, and with its tap carrying regulated voltage of say 105 volts connected to terminal 2. The cathodes 21 and 31 of tubes 20 and 30 are connected to line 1. Grid 22 is connected across the fixed capacitor 15' to terminal 64, and grid 32 is connected across one of the capacitors 71, 72, 73, 74 to terminal 66 of the secondary winding 62, 63, respectively, of transformer 60. The common terminal 65 of these windings is connected to line 1. Grid 22 is further connected across one of resistors 6, 6', 6'', and 6''' and across switch 75' to terminal 5. Grid 32 is further connected across the phototube 90 and the microammeter 78 to line 2. The screen grids 23 and 33 of the tubes 20 and 30 are connected across capacitors 25, 35 to line 1, and across resistors 26, 36 to line 2. The plates 24 and 34 of the tubes 20 and 30 are connected together and across resistor 27 to line 2.

The cathode 81 of tube 80 is connected across resistor 85 to line 1, its grid 82 is connected across resistor 86 to line 1 and across capacitor 28 to the anodes 24 and 34 of tubes 20 and 30. The screen grid 83 is connected across capacitor 87 to line 1 and across resistor 88 to line 2. The plate 84 is connected across resistor 89 to line 2. The transformer 60 has a tertiary winding 69, whose midpoint 97 is connected across capacitor 96 to the plate 84, and whose opposite ends 98, 99 are connected to the anodes 44' and 43' of the twin diode 40'. The cathodes 41' and 42' of 40' are connected across resistors 45' and 45'' to midpoint 97 of the tertiary winding 69 of the transformer 60. The cathode 41' is further connected to line 1 and the cathode 42' is further connected to grid 52 of the amplifier tube 50. This grid 52 is further connected across capacitor 48 to line 1. The cathode 51 of tube 50 is connected to line 1, its screen grid 53 to line 3 and its plate 54 across choke 92 and lamp 93 also to line 3. Capacitor 95 is connected between plate 54 and line 3. The primary winding 61 of the transformer 60 is connected to a source of alternating voltage which may be of 60 cycles or of a substantially lower frequency, say below 25 C. P. S., if top sensitivity is to be achieved. The piece to be tested has to be inserted between terminals 4 and 5. The resistors 6, 6', 6'', 6''' serve the double purpose of protecting the tube 20 in case of shortcircuit between the electrodes 4 and 5, and to prevent the capacitance of objects connected to electrodes 5 to interfere with readings. To have this second action effective in all ranges of switch 75, a second deck 75' of the same switch selects automatically a resistor which will cause a voltage drop not above say 20 volts and not below say 1 volt for all current values to be measured in the selected range.

The circuit shown in Fig. 4 operates as follows:

The leakage current flowing across the pieces inserted between the terminals 4, 5 will increase the admittance between cathode 21 and grid 22, and cause a change in the A. C. voltage on plates 24, 34. This signal is amplified in tube 80. The values of the circuit elements 28, 86, 96, 45', and 45'' are so chosen that this voltage change is substantially in phase with the voltage existing in the tertiary winding 69. The A. C. voltages between anode 44' and cathode 41' and between anode 43' and cathode 42' will then be the algebraic sum and the algebraic difference, respectively, of half of the tertiary voltage in 69 and the alternating voltage on 84. Therefore, the D. C. voltage across 45' will increase and the D. C. voltage across 45'' will decrease, or vice versa, and the grid voltage, and consequently, the plate current of the tube 50, will increase or decrease causing an increased or decreased lamp current and increased or decreased photoelectric current in 90, according to the magnitude and polarity of the A. C. appearing on plate 84. With proper polarity of the tertiary 69, this will tend to restore balance, and a new state of equilibrium will be reached in which the photoelectric current across 90 is substantially proportional to the current flowing between the terminals 4, 5. In this way, the microammeter 78 gives a direct information on the leakage current of the piece installed between 4 and 5.

In the foregoing embodiments, currents caused by physical quantities of different kind were sent through the circuit element having logarithmic voltage/current characteristics: The various physical quantities controlling small direct currents were compared against the alternating currents caused by a source of alternating voltage and a capacitor. In such applications the indication will vary if the sensitivity (i. e., current passed per unit of the respective physical quantity) of the circuit elements sensitive to the respective physical quantities varies. In the following embodiments, physical quantities will be compared with others of the same kind, and indication will be independent of variations in sensitivity of the circuit elements sensitive to the physical quantities to be detected.

One such embodiment is shown in Figs. 5 and 6. It may be used to determine the spectral composition of a source of light. 201 denotes a source of light, e. g. a flame colored by chemicals, the composition of which is to be determined. 203 is a condensing lens, and 204 is a disc having four windows with color filters 205, 205', 205'' and 205''' in these windows. 206 denotes a shaft to which the disc 204 is fastened, and 207 denotes an insulating disc fastened to the same shaft 206. 208 is a conducting metal segment inserted into disc 207. 10 denotes a photo-tube having a cathode 11 and an anode 14. 209, 209', 209'', and 209''' represent collector brushes. 20 represents again an amplifier tube having a cathode 21, a grid 22, a screen grid 23, and an anode 24, and 30 represents an amplifier tube having a cathode 31, a grid 32, and an anode 34. 40' and 40'' are twin diodes having each two cathodes 41', 42' and 41'', 42'', respectively, and two anodes 44', 43' and 44'', 43'', respectively, 50' and 80' are double triodes having each two cathodes 51', 51'' and 81', 81'', two grids 52', 52'' and 82', 82'' and two anodes 54', 54'' and 84', 84''. 78' and 78'' are D. C. galvanometers. The circuit is fed from a supply of direct voltage not shown in the drawing which delivers a positive voltage of say 150 volts between lines 2 and 1, and a negative voltage of say 150 volts between lines 2' and 1.

The anode 14 of the phototube 10 is connected via line 212 to the positive line 2, and its cathode 11 is connected via line 210 to grid 22 of the first tube 20. This line 210 has to be carefully insulated, and it will preferably be held as short as feasible and shielded by a shield 7 from outside interferences. The connection of the tubes 20 and 30 is conventional with the one exception that there is no connection to grid 22, except by line 210, and that therefore the grid to cathode current in 20 must equal the photoelectric current across 10. The output of the two stage amplifier consisting of tubes 20, 30 is applied across capacitors 49, 49', 49'', and 49''' to the plates 43'', 44'', 43', and 44' of the twin diodes 40'' and 40'. These plates are further connected to the midpoints of voltage dividers 46, 47; 46', 47'; 46'', 47''; and 46''', 47''' respectively; the ends of which voltage dividers are connected to lines 1 and 2. The cathodes 41, 42, 41'', and 42'' of these twin diodes 40' and 40'' are connected via resistors 45, 45', 45'', and 45''' to the positive line 2, and across lines 211, 211', 211'', and 211''' to one each of the brushes 209, 209', 209'', and 209'''. The conducting segment 208 is connected via line 213 to the line 1. The anodes 54', 54'', 84', and 84'' of the twin triodes 50', 80' are connected to line 2; their grids 52', 52'', 82', and 82'' are connected across resistors 57, 57', 57'', and 57''' to anodes 44', 43', 44'', and 43'' of the twin diodes 40' and 40''; and their cathodes 51', 51'', 81', and 81'' are connected across resistors 59, 59', 59'', and 59''' to the negative line 2'.

The galvanometer 78' is connected between the cathodes 51' and 51'' of the tube 50', and the galvanometer 78'' is connected between the cathodes 81' and 81'' of the tube 80'.

The operation of this device is as follows:

The shaft 206 is rotated at a speed of e. g. 250 R. P. M. during which rotation the filters 205, 205', 205'', and 205''' are interposed one after the other between the condenser lens 203 and the phototube 10. Simultaneously, the conducting sector 208 makes contact with the brushes 209, 209', 209'', and 209''', respectively.

The lens 203 concentrates light from the light source 201 upon the plane of the filters 205, 205', 205'', and 205'''. The light, passed by that filter which at any particular time is positioned in front of the phototube, reaches the cathode 11 of this tube, and causes a certain photoelectric emission to the anode 14. In view of Kirchoff's law, a cathode to grid current equal to this photoelectric emission must flow from the cathode 21 to the grid 22 of the tube 20. Grid 22 will therefore assume that potential at which this particular value of grid current passes. The variations of this voltage difference are amplified by the tubes 20, 30 and are applied via the condensers 49, 49', 49'', and 49''' to the plates 43'', 44'' and 43', 44' of the twin diodes 40' and 40''. The time constant of the condenser 28, resistor 38 combination as well as the time constants of the condensers 49', 49, 49'', and 49''', with the coordinated resistors 46, 47, 46', 47', etc., and is chosen high enough to keep the diode anodes 44', 43', 44'', and 43'' at a substantially constant potential for the duration of the passage of each filter 205, 205', 205'', and 205''' in front of the phototube 10.

According to the spectral composition of the light source 201 and the selectivity of the filters 205, 205', 205'', and 205''', the time curves of voltage on the diode plates will assume shapes as are shown schematically by lines H of Figs. 7 and 8. On Fig. 7, O represents the voltage of line 1 used as a reference, J the voltage of cathode 41', H that of anode 44'. M is the average of line H. On Fig. 8 the same letters refer to the same curves of cathode 42' and anode 43'. The curves H of Figs. 7 and 8 are similar to each other. They differ from each other only in their average height, this height being determined by the action of the diodes in the following manner:

The diode cathodes are held for most of the time at the potential of line 2 via resistors 45, 45', 45'', and 45'''. With the cathodes held at this positive potential, no current can flow in these diodes. During the passage of each color filter in front of the phototube, however, one of the diode cathodes is shortened to line 1 across one of the brushes 209, 209', 209'', and 209'''. In these periods, the respective diode systems become conductive and the respective anode will assume a voltage close to that of its coordinated cathode. The height of the voltage curve during this period will determine the average height of the entire voltage curve. As a consequence, grids 52', 52'' of the twin triode 50', which are connected to the anodes 44', 43' of the diode 40', assume a voltage difference depending on the logarithms of the proportion of the photoelectric currents flowing through the tube 10 during the passage of the two filters 205' and 205, and the current across the meter 78' depends in direction and magnitude on the proportion between light transmitted in these two periods. Meter 78'' will indicate in a similar way the proportion between the light transmitted by filters 205''' and 205'.

Since the instrument is sensitive only to the proportion between these components of the light emission, it will give true indication irrespective of variations in the intensity of the flame, ageing of the phototube, or any other causes that affect all components of the light in the same proportion. One of the filters may be gray, colorless, or may be entirely omitted, in order to have as a reference the total light intensity of the flame or a desired percentage of it. Any number of filters and any number of double diodes may be used. In the example given in the drawing, both filters 205 and 205''' are compared with filter 205'. Filter 205'' is not used. It could be omitted entirely, it could be compared by a third twin diode with filter 205', or whilst 205 is compared with 205', 205''' could be compared with 205''. One grid might also be connected to a voltage divider between two or more diode anodes, in order to obtain an average depending on two or more color filters. By varying the ratio of the divider arms, any desired weight can be given to each filter.

In the above example, the instrument was used to indicate the color composition of a flame, but the same circuit may be used to give exact numerical data on the color of a reflecting or a transparent material by illuminating it by a suitable light source and determining the proportion between the components falling within certain wave length limits of the transmitted or reflected light.

Figure 9:
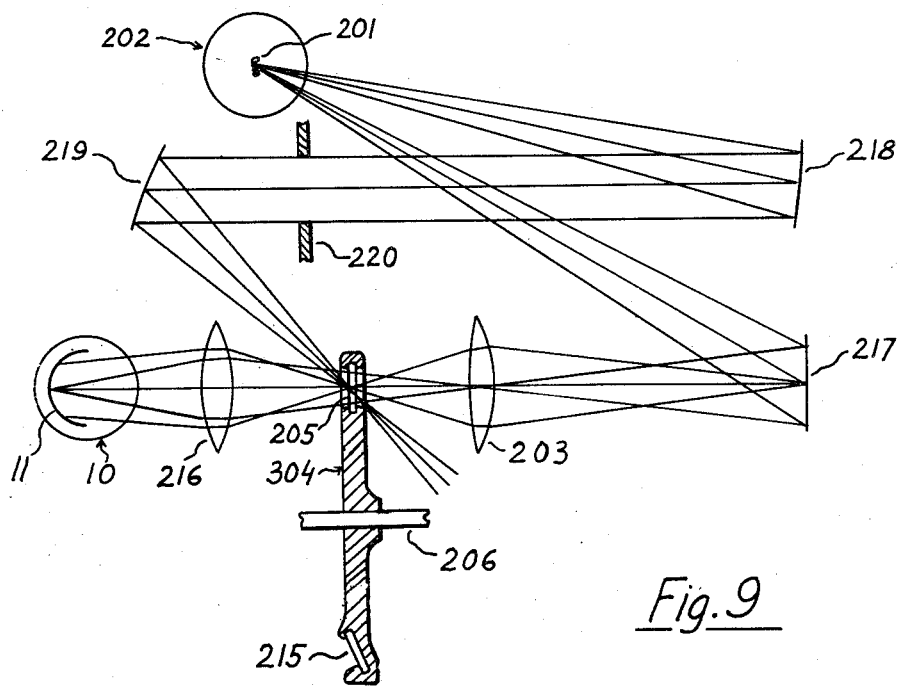
Fig. 9 illustrates diagrammatically a device for determining quantitatively the color of a reflecting material.

If only the shade or particular variety of the color is to be determined, then an optical arrangement substantially similar to that of Figs. 5 and 6 may be used, with the sample to be tested in place of the flame 201, but if also the density of the color is to be determined, then it is advantageous to use, as a reference, some light of the source that is not reflected from or passed through the material to be tested. Fig. 9 shows a schematic optical arrangement for this purpose which may be used with an amplifier similar to that shown in Fig. 6. Here 201 denotes a light source which may be the filament of an incandescent lamp 202. 217 indicates the surface of the material the light reflection from which is to be tested; 203 is a lens; 304 is a disc which can be rotated by its shaft 206, 216 a second lens, and 10 a phototube having a cathode 11 and an anode not shown. 218 is a spherical mirror. 219 is another spherical mirror. The disc 304 has a flat portion and one bent segment. The flat portion contains a number of windows for insertion of color filters 205; the bent portion locates a plane mirror 215. 220 denotes an aperture stop.

The surface 217 is illuminated by lamp 202. The light reflected from it is gathered by lens 203 in the plane of the filters 205. Lens 203 is imaged by lens 216 onto the photoelectric cathode 11. During the period in which the bent portion of the disc 304 passes between the lenses 203 and 216, the light reflected from surface 217 can not reach the phototube, there being no passage through the inclined mirror 215. However, light falling on mirror 218 is reflected by mirror 219 onto the mirror 215, which directs it across lens 216 to the photoelectric cathode 11. Thus, whereas during the passage of the filters 205 between the lenses 203 and 216, the phototube is illuminated by the various components of the light which is reflected from 217, the phototube is illuminated by an amount of light depending only on the light emission of the light source and of the setting of the aperture stop 220 during the passage of mirror 215 between the same lenses. In this manner, there may be compared the light reflection in desired bands with an adjustable amount of light emitted from the lamp. The galvanometers of the instrument may thus determine directly the color of materials in any accepted system of color determination without the need of visual color matching. The readings will again be independent from variations in light intensity of the lamp. To prevent variations in the color of the light emitted for extremely exact measurements, or where the line voltage is very unstable, the voltage applied to the lamp can be kept constant by some voltage regulating transformer.

Figure 10:
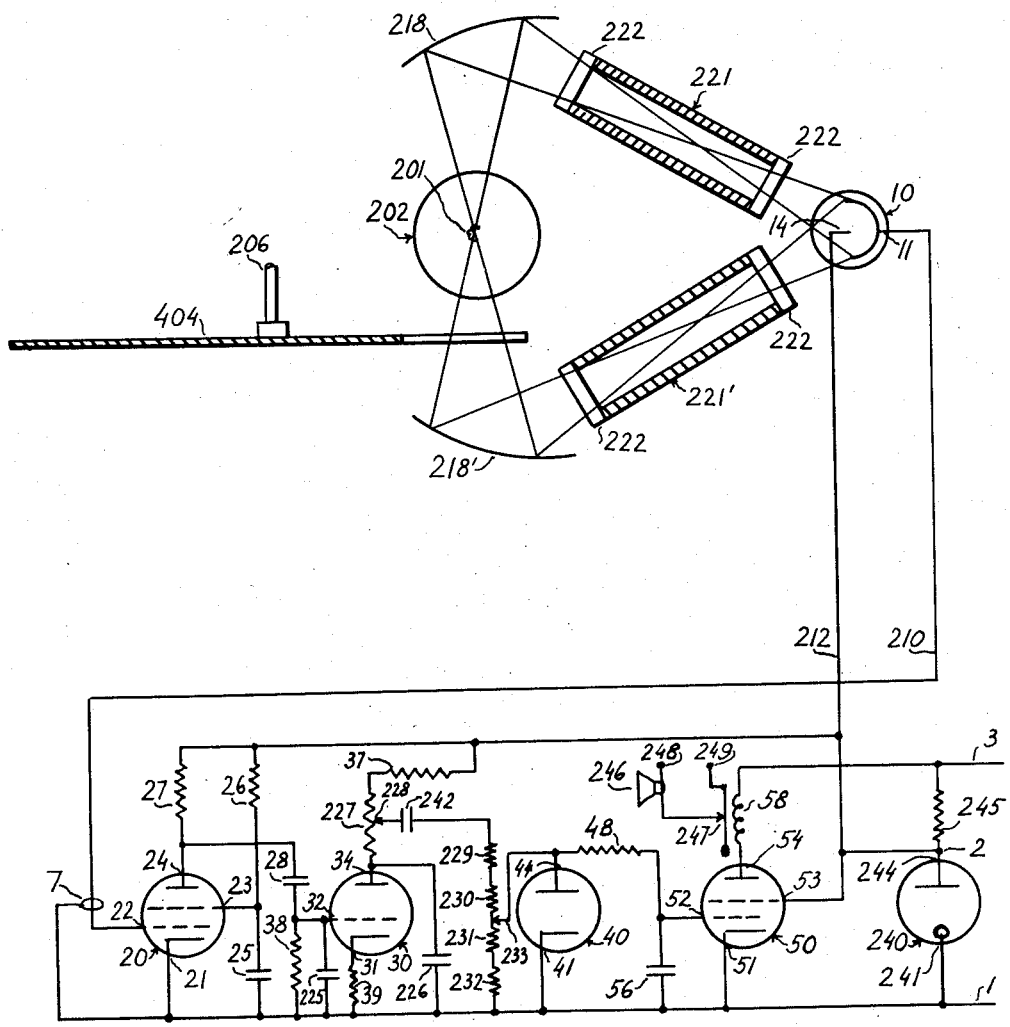
Fig. 10 shows a device, together with its circuit diagram, suitable to actuate a signal if the transparency of a medium transgresses certain limits.

In the two preceding embodiments, more than two physical quantities of the same kind were compared with each other. In the embodiment of Fig. 10, only two physical quantities of the same kind are compared with each other. In this figure, which includes a circuit I have disclosed in my co-pending application Ser. No. 58,423, 201 denotes the filament of an incandescent lamp 202. 218 and 218' are spherical mirrors, and 221 and 221' are containers for a liquid to be tested and a reference liquid respectively, these containers having transparent walls 222. 10 denotes a phototube having a cathode 11 and an anode 14. 404 is a disc rotatable on its shaft 206. 20, 30, and 50 denote amplifier tubes, having cathodes 21, 31, 51, grids 22, 32, 52, screen grids 23, 53, and plates 34, 24, 54, respectively. 40 is a diode having a cathode 41 and an anode 44. 240 is a voltage regulator tube, having a cathode 241 and an anode 244. 58 denotes a relay having a contact 247, whereas 246 denotes some signaling device, and 248, 249 are the terminals of a source of voltage.

The filament 201 is imaged by mirrors 218, 218' inside the fluid to be tested and inside the standard fluid, and proceeds from there towards the phototube 10. The light passing the container 221 is uninterrupted, but the light passing the container 221' is periodically interrupted by blades of a rotating disc 404 which may be of the kind shown in Fig. 12, to be described later. Line 1 is the negative and line 3 is the positive terminal of a source of direct voltage (not shown) of say 300 volts. Resistor 245 reduces this voltage to say 150 volts on line 2, held constant by the voltage regulator tube 240. The anode 14 of phototube 10 is connected via lead 212 to line 2, and its cathode 11 is connected via lead 210 to grid 22 of tube 20. Line 210 is carefully shielded by shield 7. The cathode 21 of tube 20 is connected to line 1, and its anode 24 via load resistor 27 to line 2. The voltage on screen 23 is maintained by resistor 26 and capacitor 25, the latter being large enough to keep the screen voltage substantially constant when the plate current varies due to variations in photoelectric current caused by the interruptions of light by disc 404. The output of plate 24 is brought onto grid 32 of tube 30 via capacitor 28. This grid 32 is connected to line 1 across a conventional grid resistor 38. Parallel to this grid resistor there is connected capacitor 225 in order to bypass alternating voltages of substantially higher frequency than that of the interruptions effected by disc 404. Cathode 31 is connected to ground, via a conventional cathode resistor 39, which may be bypassed by a capacitor not shown in the drawing. The load resistance of tube 30 is composed of a fixed resistor 37 and a voltage divider 227 having a variable tap 228. Capacitor 226 serves to bypass that portion of undesired frequencies which persists despite capacitor 225. The tap 228 is connected across capacitor 242 to a voltage divider consisting of a series connection of resistors 229, 230, 231, and 232. Switch 233 connects a desired tap of this voltage divider to the anode 44 of diode 40. This diode anode is further connected across resistor 48 to grid 52 of tube 50. The cathode 41 of the diode 40 is connected to line 1, and so is the cathode 51 of tube 50. Capacitor 56 is connected between grid 52 and line 1, screen 53 is connected to line 2, anode 54 is connected across the coil of relay 58 to line 3. The signalling device 246 is connected to the source of voltage 248, 249 across the contact 247 of relay 58.

The operation of this device is as follows:

The phototube 10 is illuminated by both the steady flux passing container 221 and the periodically interrupted light flux passing container 221'. The photoelectric current passing from cathode 11 to anode 14 is the sum of the currents caused by these two types of illumination, and it will have a lower limit determined by the light passing container 221 alone and an upper limit determined by the light passing both the container 221 and the container 221'. In view of Kirchoff's law, this same current passes from cathode 21 to grid 22. As shown earlier, the voltage variation on grid 22 caused by this current of varying magnitude (composed of the constant photoelectric current caused by the light passing container 221 and the varying photelectric current caused by the light passing container 221') is proportional to the logarithm of the proportion between the upper limit of the current and the lower limit of the current. It is therefore independent of variations of the light emission of the filament 201 or the sensitivity of the photocathode 11. For highest accuracy, care should be taken to have the same portions of the cathode exposed to both these light fluxes and to make the angles of incidence from both light sources equal to each other. The alternating voltage obtained on grid 22 is amplified in tubes 20 and 30 and a desired portion of the amplified voltage is applied to the diode 40. When this portion of the voltage on the anode 34 reaches a certain limit, the grid 52 becomes negative enough to cut off the plate current of tube 50 and cause the relay 58 to close contact 247 and apply operating voltage from source 248, 249 to the signalling device 246.

Figure 11:
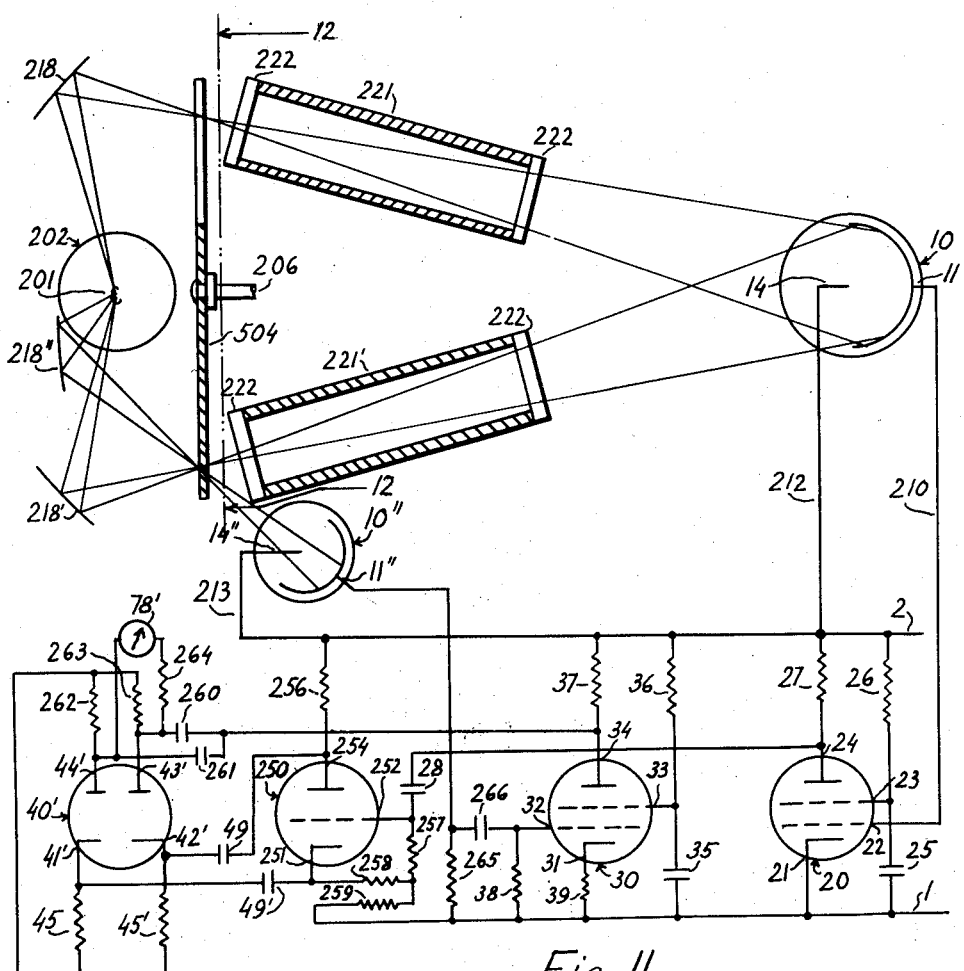
Fig. 11 represents the plan section and circuit diagram of a device to measure transparency of a medium.
Figure 12:
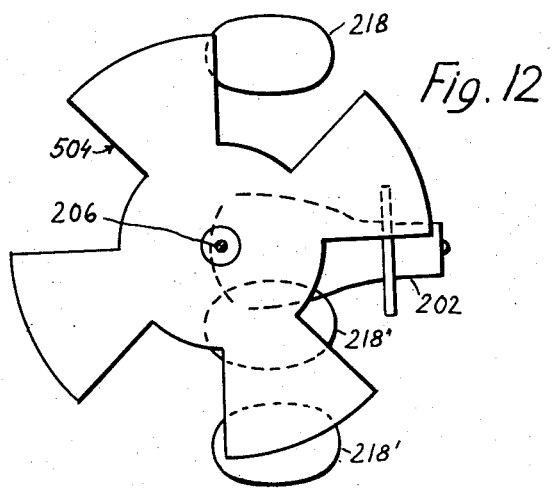
Fig. 12 is a section along the line 12—12 of Fig. 11.

The accuracy of the system just described can be increased if, instead of applying one physical quantity continuously and the other intermittently, the two are applied alternatingly and not only the amplitude of the alternating voltage obtained on the logarithmic element, which is a measure of the percentage deviation, is detected, but also its phase relationship with respect to the interruptions, which indicates which of the two physical quantities is greater. Such a system is shown in Figs. 11 and 12. In these figures, those parts that are similar to parts of earlier figures are designated by the numbers used in those earlier figures and, in addition thereto 504 is a disc so arranged that when one of said light fluxes is interrupted, the other is uninterrupted, and vice versa. The periods of full interruption and of full passage are lengthened, and the periods of transition are shortened by focusing an image of filament 201 on the plane of the disc 504.

The circuit comprises an additional phototube 10'' having a cathode 11'' and an anode 14''. This phototube is illuminated from filament 201 by light reflected from a spherical mirror 218''. This mirror focuses the image of filament 201 on the same spot on which it is focused by mirror 218', so that interruption of the light proceeding toward phototube 10'' occurs simultaneously with the interruption of light passing container 221'.

The operation of this device is as follows: The phototube 10 conducts one periodically varying photoelectric current caused by the periodically interrupted light across 221 and another periodically varying current caused by the periodically interrupted light across 221'. These two currents may add to one continuous current free of periodic changes in the special case that the two light fluxes are identical, but usually their resultant is a more or less modulated current, the polarity of modulation depending on which of the two light fluxes is stronger. The photoelectric current flowing across 10 passes from cathode 21 to grid 22 of tube 20, and causes between these electrodes a voltage drop whose instantaneous values are in linear relationship to the logarithm of the instantaneous value of the photoelectric current. The alternating component of this voltage is amplified in tube 20 and brought to the grid 252 of a phase splitting tube 250. On the cathode 251 and on the anode 254 of this tube alternating voltages are obtained substantially equal to each other and to the output voltage obtained on anode 24, but being of opposite polarity. These two voltages are applied to the cathodes 41' and 42' of a twin diode 40'. The photoelectric current of the phototube 10'' is conducted across a conventional load resistor 265 and is amplified in a conventional manner in tube 30. The output of this tube is applied across capacitors 260 and 261 to both anodes 44', 43' of the twin diode 40'. The circuit elements of the various amplifier stages are so chosen that the signals obtained on the anodes 44', 43' are in phase with the signal obtained on cathode 41' and in opposite phase with the signal obtained on cathode 42', or vice versa, according to whether the photoelectric current caused by the light across 221 is greater or smaller than the photoelectric current caused by the light across container 221'. The desired relationship can be achieved either by making the time constants of the resistance capacitance combinations so high that phase shift due to them is negligible, or by choosing them so that the phase shift in the amplifier train from 10 to 40' equals that of the phase shift in amplifier train from 10'' to 40', or by making one of these phase shifts to differ from the other by 180° or an integer multiple of 180°. Then the alternating voltage in one diode system is equal to the sum and the alternating voltage across the other diode system is equal to the difference of the outputs of tubes 20 and 30. The rectified voltage appearing across resistor 262 will be above or below that appearing across resistor 263, according to whether the light passing the container 221 is above or below that passing the container 221'. The magnitude of this voltage difference is a measure of the percentage deviation between these two fluxes of light. The difference between the voltages across the two equal resistors 262 and 263 causes a current across a limiting resistor 264 and microammeter 78', which may be calibrated directly in plus and minus percents of transmission of light across one fluid compared to the transmission across the other fluid.

Figure 13:
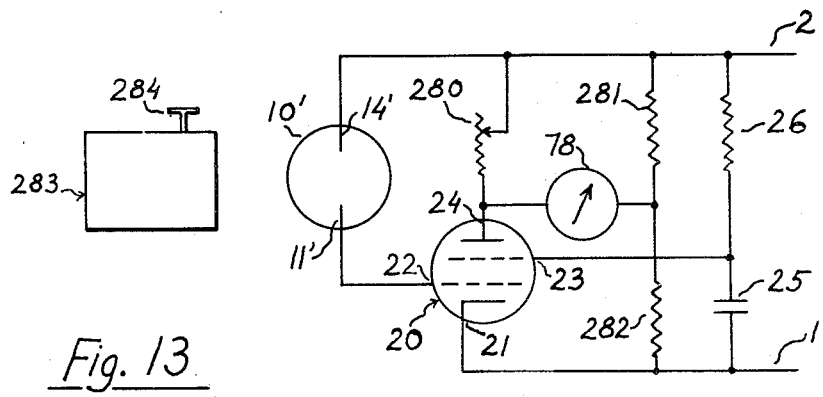
Fig. 13 illustrates schematically a device for measuring ionization.

In the preceding embodiments, the inconstant current varies periodically. An example for detecting a physical quantity by adding to the current caused by it one single pulse caused by a physical quantity of the same kind and of known value is given in Fig. 13. It represents an instrument to measure the ionization present in a certain locality in terms of ionization from a reference source of ionization 283. In this figure, 10' denotes an ionization gauge having a cathode 11' and an anode 14', and 20 is an amplifier tube having a cathode 21, a grid 22, a screen grid 23, and an anode 24. A source of direct current, not shown in the figure, supplies a voltage of say 300 volts, which may be kept constant by a series connection of two voltage regulating tubes, likewise not shown. Line 1 is the negative and line 2 is the positive terminal of this source. The anode 14' of the ionization gauge 10' is connected to line 2, whereas its cathode 11' is connected to grid 22 of tube 20. Cathode 21 of tube 20 is connected to line 1, screen 23 is connected to line 2 across a resistor 26 of say 3 megohms and to line 1 across an oil filled condenser 25 of say 2 microfarads. Plate 24 is connected to the midpoint of a voltage divider 281, 282 across the meter 78 having a full scale deflection of say 50 microamperes, and it is connected to line 2 across the variable resistor 280. 283 is some source of ionization. It may be a small generator of X-rays, a well shielded quantity of some radio-active material, or any other convenient source of radiation. 284 symbolized means to start or stop action of such generator of ionization on the gauge 10'. In the case of an X-ray generator, it may be a switch to apply plate power, in the case of a radioactive material, it may be the lever to a shielding window, the opening of which allows the radiation to act on the gauge 10'.

The operation of the apparatus is the following: Before making a measurement, the operator adjusts the resistor 280 so that the meter 78 reads zero. He then depresses lever 284 and reads the deflection of the instrument. This deflection will be a measure of ambient ionization. This action is based on the following facts:

The ionization present in the locality will cause a certain ionization current to flow in 10', and this ionization current will pass from cathode 21 to grid 22. This current will cause a certain voltage drop to exist between these electrodes 21, 22. The current across resistor 26 will assume a stationary value at which the voltage on screen grid 23 will be as high as is required to cause this current to flow from cathode 21 to screen 23, with the voltage on grid 22 as high as determined by the ionization current in 10'. If now, the ionization current suddenly varies, the screen voltage will vary very slowly, due to the high time constant of combination 25, 26. The plate current will vary abruptly by an amount significant of the change in grid voltage. The variation in grid voltage, in turn will be dependent on the logarithm of the proportion between ionization current before activating 283 and ionization current after activating it, and thus the swing of the meter 78 in consequence of the depression of lever 284 is an indication of the proportion between the ambient ionization to be determined and the additional ionization caused by generator 283.

Figure 15:
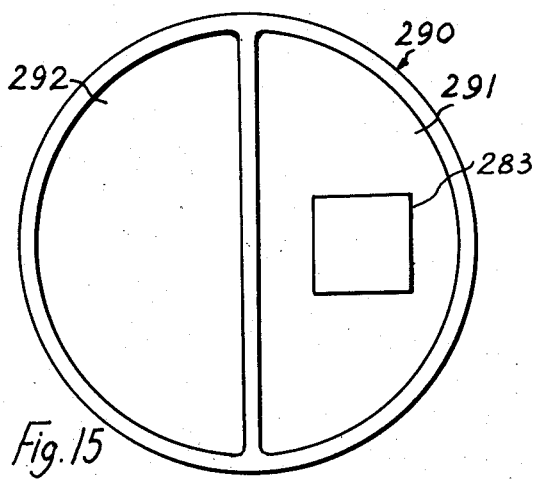
Fig. 15 is a plan view of the device shown in Fig. 14.
Figure 16:
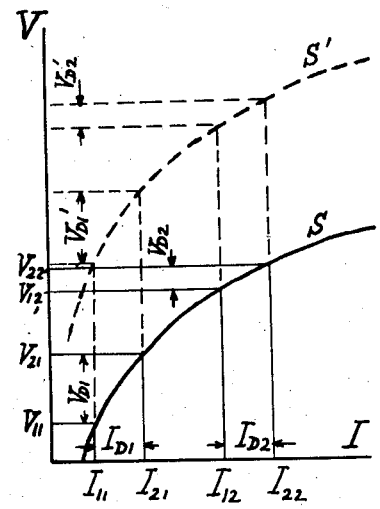
Fig. 16 represents logarithmic characteristics between current I and voltage V.
Figure 14:
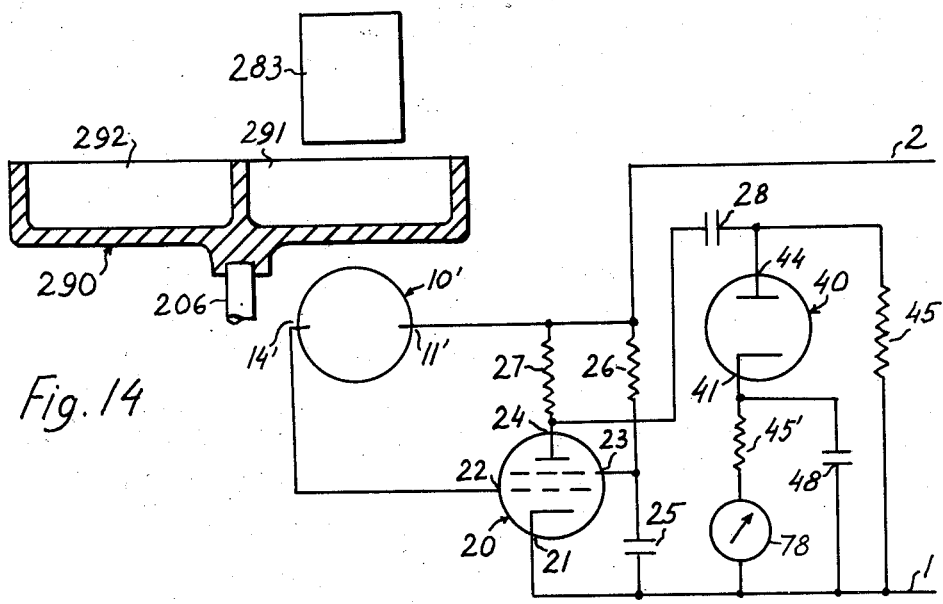
Fig. 14 shows in a side section a device to measure the absorption of gamma radiation, together with the diagram of a simple circuit for it.

If the physical quantity to be detected is some transmission property of a certain material, then this material may be periodically interposed as shown in Figs. 14 and 15. They represent a device for measuring the transmission of gamma radiations across a certain thickness of a material. In these figures, 290 represents a rotatable platform comprising two open containers 291, 292 into one of which the material to be tested is to be poured. 283 is a generator of gamma radiations, and 10' is an ionization gauge having a cathode 11' and an anode 14'. The platform 290 is rotated around the axis of its shaft 205.

The radiation from 283 to 10' is intercepted for part of the time by the empty container and for part of the time by the container which contains the material to be tested. Accordingly, the currents in 10' will vary between an upper limit set by the transmission of the empty container and a lower limit set by the transmission of the full container. The voltage variations between 22 and 21 are, as described before, proportional to the logarithm of the ratio of the two levels of transmitted radiation. These voltage variations are amplified by the tube 20, rectified by the diode 40, and indicated by the meter 78.

The one of the two containers 291, 292 being filled with the material to be tested, the other container may be filled with a material to be used as a reference. In that case, the circuit shown would indicate only the proportion between the radiations obtained in the two periods, but not which of the two materials has the higher absorption. For certain purposes, this may be adequate, such as where it is definitely known which of the two materials has the higher absorption, or if it is only desired to check uniformity irrespective of the direction of deviation, but for other purposes it will be preferable to provide a monitoring circuit, e. g. on the principles underlying Fig. 6 or Fig. 11, adapted for indication of the direction of the deviation.

It will be noted that whilst in previous art, the currents to be detected by an amplifier tube were conducted across a load resistor and the voltage across said load resistor was applied between the grid and the cathode, or preferably between the grid and a point negative with respect to the cathode, I conduct the currents to be detected across the grid to cathode path of the amplifier tube and detect the voltage drop caused by these currents across this path. For this purpose, it is necessary to conduct said currents in the direction in which the grid to cathode path is conductive. It is also necessary that the electrode that is being connected to the grid be insulated from the cathode in order to prevent part of the current to be detected from bypassing said path. Any conductor that would exist between grid and cathode or between grid and other points of the circuit connected to the cathode across galvanic circuit elements would create such bypass which is undesired here. The other electrode of the circuit element that passes the current to be detected will conveniently be connected to the cathode across circuit elements adapted to conduct direct current to complete the circuit. These circuit elements adapted to conduct direct current might include a source of voltage and, if desired, resistors for the purpose of limiting or filtering the current. But I have found that in many cases I do not need the source of voltage just mentioned. For example, in a circuit as shown in Fig. 10, satisfactory results may be obtained when connecting the anode 14 of the phototube 10 e. g. a type 929 phototube to line 1. I arrived at good results even when disconnecting the anode 14 entirely. It may be presumed that in these cases, leakage currents between anode 14 and line 1 complete the circuit. As a rule, however, galvanic connection across well determined circuit elements will give more reliable results. The voltage between the grid and the cathode will appear in series with other electromotive forces in the circuit containing the circuit element the current through which is to be detected. Therefore, this circuit element should be chosen so that said voltage between grid and cathode and variations thereof will not adversely affect the accuracy and linearity of the response of said circuit element.

While I have illustrated in the drawings and described in the foregoing description several specific embodiments of my invention I desire it to be understood that these embodiments have been given by way of example only since the illustrated circuits and structural elements may be modified and interchanged in many ways which will be obvious to those skilled in the art of applied electronics. Furthermore, the invention is not limited to such applications as are shown in the drawings, the illustrated photometers, spectrometer, ionization gauge, colorimeter, etc., being only illustrative for the wide applicability of the principles of the invention, many other applications being possible without departing from the spirit of the invention or the scope of the appended claims.

What I claim is:

1. A method of comparing two or more physical quantities, comprising the steps of causing electric currents whose magnitudes are functions of said physical quantities and of which one at least is inconstant in such a manner as to vary its instantaneous value by an amplitude depending on the magnitude of the coordinated physical quantity to flow simultaneously between the electrodes of such a circuit element that a current within the range of the momentary values of the algebraic sums of said currents passing through said circuit element will cause a voltage between said electrodes which is a logarithmic function of such current as passes between said electrodes, and detecting the variations of voltage occurring between said electrodes at the rate of the variations of the instantaneous value of said inconstant current.

2. A method of comparing two or more physical quantities through the intermediary of a vacuum tube having at least one thermionic cathode and at least one other electrode, the electron emission to which from said cathode is temperature limited, comprising the steps of causing electric currents whose magnitudes are functions of said physical quantities and of which one at least is inconstant in such a manner as to vary its instantaneous value by an amplitude depending on the magnitude of the coordinated physical quantity, to flow simultaneously between said cathode and said other electrode of said vacuum tube, and detecting the variations of voltage occurring between said cathode and said other electrode of said vacuum tube at the rate of the variations of the instantaneous value of said inconstant current.

3. A method of detecting a physical quantity by comparison with another physical quantity of the same kind, at least one of said physical quantities being inconstant in such a manner as to vary its instantaneous value by an amplitude depending on the magnitude of the coordinated physical quantity, comprising the steps of causing both said physical quantities to influence simultaneously a circuit element so as to pass through it a current whose magnitude is proportional to the sum of the instantaneous values of said two physical quantities, causing the current across said circuit element to flow across the electrodes of another circuit element having at least two electrodes the voltage across which is a logarithmic function of such current as passes across these electrodes, and detecting the voltage variations across said electrodes of said other circuit element occurring at the rate of said variations of the instantaneous value of said inconstant physical quantity.

4. A method of detecting a physical quantity by comparison with another physical quantity of the same kind, through the intermediary of a vacuum tube having at least one thermionic cathode and one other electrode the electron emission to which from said cathode is temperature limited, at least one of said physical quantities being inconstant in such a manner as to vary its instantaneous value by an amplitude depending on the magnitude of the coordinated physical quantity, comprising the steps of causing both said physical quantities to influence simultaneously a circuit element so as to pass through it a current whose magnitude is proportional to the sum of the instantaneous values of said two physical quantities, causing the current across said circuit element to flow between said thermionic cathode and said other electrode of said vacuum tube, and detecting the voltage variations between said thermionic cathode and said other electrode occurring at the rate of said variations of the instantaneous value of said inconstant physical quantity.

5. A method of detecting a first physical quantity by comparison with a second physical quantity of the same kind through the intermediary of a first electric circuit element having at least two electrodes the voltage across which is a logarithmic function of such current as passes across these electrodes, comprising the steps of varying the magnitude of one of said physical quantities between an upper limit and a lower limit, causing both said physical quantities to influence simultaneously a second circuit element so as to pass through it a current whose magnitude is proportional to the sum of the instantaneous values of said two physical quantities, causing the current across said second circuit element to flow across said electrodes of said first circuit element, and detecting the voltage variations across said electrodes of said first circuit element occurring at the rate of said variations of the magnitude of the one of said physical quantities.

6. A method of detecting a first physical quantity by comparison with a second physical quantity of the same kind through the intermediary of a vacuum tube having at least one thermionic cathode and one other electrode, the current to said other electrode from said thermionic cathode being temperature limited, comprising the steps of varying the magnitude of one of said physical quantities between an upper and a lower limit, causing both said physical quantities to influence simultaneously a circuit element so as to pass through it a current whose magnitude is proportional to the sum of the instantaneous values of said two physical quantities, causing the current across said second circuit element to flow between said cathode and said other electrode of said vacuum tube, and detecting the voltage variations between said cathode and said other electrode occurring at the rate of said variations of the magnitude of the one of said physical quantities.

7. A method of detecting a first physical quantity by comparison with a second physical quantity of the same kind and known magnitude through the intermediary of a first electric circuit element having at least two electrodes the voltage across which is a logarithmic function of such current as passes across these electrodes, comprising the steps of varying the magnitude of said second physical quantity between known limits, causing both said physical quantities to influence simultaneously a second circuit element so as to pass through it a current whose magnitude is proportional to the sum of the instantaneous values of said two physical quantities, causing the current across said second circuit element to flow across said electrodes of said first circuit element, and detecting the voltage variations across said electrodes of said first circuit element occurring at the rate of said variations of the magnitude of said second physical quantity.

8. A method of detecting a first physical quantity by comparison with a second physical quantity of the same kind and known magnitude through the intermediary of a vacuum tube having at least one thermionic cathode and one other electrode, the current to said other electrode from said thermionic cathode being temperature limited, comprising the steps of varying the magnitude of said second physical quantity between known limits, causing both said physical quantities to influence simultaneously a circuit element so as to pass through it a current whose magnitude is proportional to the sum of the instantaneous values of said two physical quantities, causing the current across said circuit element to flow between said cathode and said other electrode of said vacuum tube, and detecting the voltage variations between said cathode and said other electrode occurring at the rate of said variations of the magnitude of said second physical quantity.

9. A device to detect a physical quantity, comprising a circuit element adapted to pass a current proportional to the physical quantity to be detected, said circuit element having two electrodes, a vacuum tube having at least one thermionic cathode and one other electrode, a source of alternating voltage of given frequency, means for detecting the alternating voltage of said frequency between said thermionic cathode and said other electrode, one of said electrodes of said circuit element being connected to the first of said other electrodes of said vacuum tube and insulated from said thermionic cathode, the other electrode of said circuit element being connected to said thermionic cathode across circuit elements adapted to conduct direct current, said source of alternating voltage being arranged in series with a capacitance, and said series connection of voltage source and capacitance being connected between said thermionic cathode and said other electrode of said vacuum tube.

10. A device according to claim 9 wherein the source of alternating voltage has a frequency below 25 cycles per second.

11. A device for detecting a physical quantity comprising a circuit element adapted to pass a current proportional to the physical quantity to be detected and having two electrodes, a vacuum tube having at least one thermionic cathode, one grid and one anode, said anode of said vacuum tube being connected to said cathode of said vacuum tube across a path adapted to conduct direct current and having alternating current impedance, a source of alternating voltage of a given frequency, means for detecting the alternating voltage of said frequency on said anode of said vacuum tube, one of said electrodes of said circuit element being connected to said grid of said vacuum tube and insulated from said thermionic cathode of said vacuum tube, the other electrode of said circuit element being connected to said thermionic cathode of said vacuum tube through circuit elements adapted to conduct direct current, said source of alternating voltage being arranged in series with a capacitance, said series connection of voltage source and capacitance being connected between said thermionic cathode and said grid of said vacuum tube, and means for injecting an adjustable amount of alternating current of said frequency into said path.

12. A device as claimed in claim 11 and having means for automatically controlling the amount of alternating current injected into said path adapted to conduct direct current and having alternating current impedance in dependence on the alternating voltage of said anode, and means for detecting the magnitude of the automatic action of said control means.

13. A device for determining the proportions between a number of physical quantities of equal kind, comprising an electrical circuit element sensitive to the kind of physical quantities to be determined, means to cause said physical quantities to alternatingly act upon said circuit element, a vacuum tube having at least one cathode and one other electrode, means for detecting the difference between the voltage differences between said cathode and said other electrode during action of at least two of said physical quantities on said circuit element, one electrode of said circuit element being connected to the first of said other electrodes of said vacuum tube and insulated from said cathode of said vacuum tube, and the other electrode of said circuit element being connected to said cathode of said vacuum tube through circuit elements adapted to conduct direct current.

14. A device for comparing a first physical quantity with a second physical quantity of equal kind, comprising an electrical circuit element sensitive to said physical quantities, a vacuum tube having at least one cathode and one other electrode, means for periodically interrupting the action of said first physical quantity upon said circuit element, means for detecting the alternating voltage of the frequency of said interruptions present between the first of said other electrodes and said cathode of said vacuum tube, one electrode of said circuit element being connected to the first of said other electrodes of said vacuum tube and insulated from said cathode of said vacuum tube, and the other electrode of said circuit element being connected to said cathode of said vacuum tube through circuit elements adapted to conduct direct current.

15. A device for comparing a first physical quantity with a second physical quantity of equal kind, comprising an electrical circuit element sensitive to said physical quantities, a vacuum tube having at least one cathode and one other electrode, means to alternatingly interrupt the action of said physical quantities on said circuit element, means adapted to detect magnitude and direction of the variation of voltage occurring between an interruption of the action of one of said physical quantities on said circuit element and the following interruption of the action of the other of said physical quantities on said circuit element, one electrode of said circuit element being connected to the first of said other electrodes of said vacuum tube and insulated from said cathode of said vacuum tube, and the other electrode of said circuit element being connected to said cathode of said vacuum tube through circuit elements adapted to conduct direct current.

16. A device for measuring a physical quantity, comprising an electrical circuit element sensitive to said physical quantity, a vacuum tube having at least one cathode and one other electrode, a source adapted to generate a second physical quantity of the same kind as that to be measured, means to abruptly initiate action of said source on said circuit element for abruptly changing the voltage between said other electrode and said cathode of said vacuum tube, means for measuring said abrupt voltage changes, one electrode of said circuit element being connected to the first of said other electrodes of said vacuum tube and insulated from said cathode of said vacuum tube, and the other electrode of said circuit element being connected to said cathode of said vacuum tube through circuit elements adapted to conduct direct current.

17. A device for measuring a first physical quantity, comprising an electrical circuit element sensitive to said physical quantity, a vacuum tube having at least one cathode and one other electrode, a source adapted to generate a second physical quantity of the same kind as that to be measured, means to abruptly interrupt action of said source on said circuit element for abruptly changing the voltage between said other electrode and said cathode of said vacuum tube, means for measuring said abrupt voltage changes, one electrode of said circuit element being connected to the first of said other electrodes of said vacuum tube and insulated from said cathode of said vacuum tube, and the other electrode of said circuit element being connected to said cathode of said vacuum tube through circuit elements adapted to conduct direct current.

JOSEPH C. FROMMER.

REFERENCES CITED

The following references are of record in the file of this patent:

UNITED STATES PATENTS

| Number | Name | Date |
| --- | --- | --- |
| 2,244,369 | Martin | June 3, 1941 |